March 2, 1926.
I. V. EDGERTON
POULTRY CAR
Filed Oct. 18, 1924
1,574,802
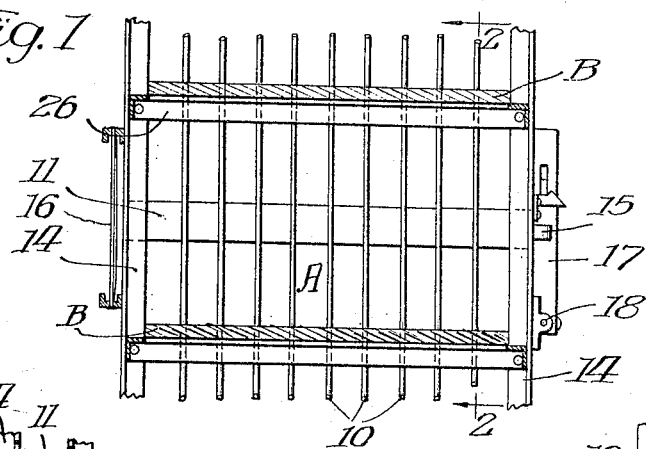
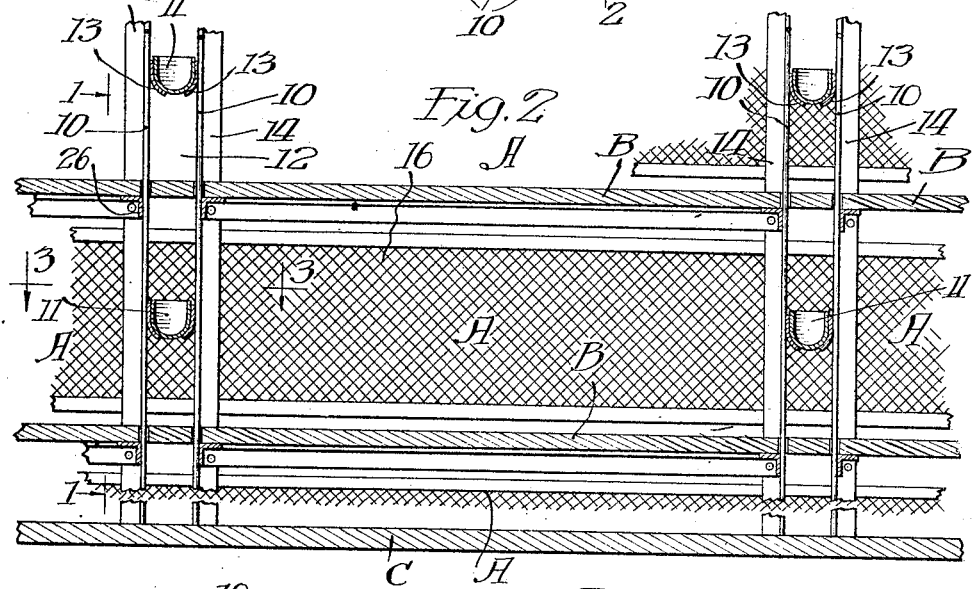
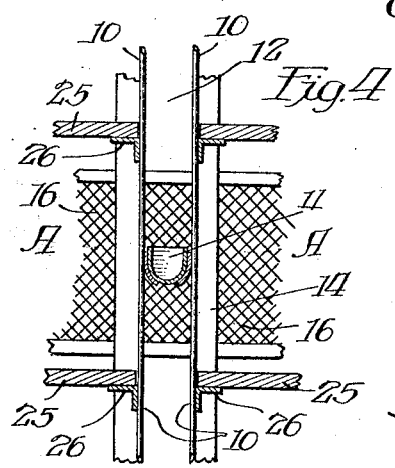
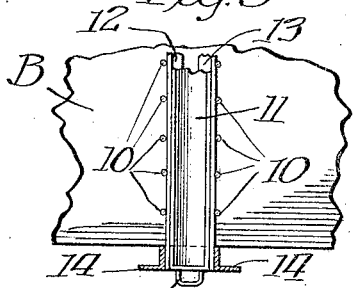
Inventor:
Israel V. Edgerton,
Fisher, Towle, Clapp & Soans
Attys.

Patented Mar. 2, 1926.

1,574,802

UNITED STATES PATENT OFFICE.

ISRAEL V. EDGERTON, OF CHICAGO, ILLINOIS.

POULTRY CAR.

Application filed October 18, 1924. Serial No. 744,520.

*To all whom it may concern:*

Be it known that I, ISRAEL V. EDGERTON, a citizen of the United States, residing at Chicago, in the county of Cook and State of Illinois, have invented certain new and useful Improvements in Poultry Cars, of which I do declare the following to be a full, clear, and exact description, reference being had to the accompanying drawings, forming a part of this specification.

This invention relates to railroad cars but more particularly such as are designed for the transportation of live poultry and has for its primary object to provide a simple, economical and efficient car of this type.

Further objects of my invention are to provide an improved coop construction and to provide an improved feed trough arrangement.

The general construction of my poultry car is substantially the same as that forming the subject matter of Letters Patent No. 1,512,215 granted to me October 21, 1924, and reference may be had thereto for a full description thereof.

The many other objects and advantages of my invention will be better understood by reference to the following specification when considered in connection with the accompanying drawing illustrating certain selected embodiments thereof in which:—

Fig. 1 is a transverse vertical section on the line 1—1 of Fig. 2.

Fig. 2 is a vertical longitudinal section on the line 2—2 of Fig. 1.

Fig. 3 is a fragmentary horizontal section on the line 3—3 of Fig. 2, and

Fig. 4 is a fragmentary section similar to Fig. 2 of a modified form of car construction.

Referring to the drawings and particularly to Figs. 1 to 3 inclusive, the poultry car is divided into a plurality of small compartments or coops A usually arranged in tiers upon opposite sides of a longitudinal aisle or passageway. In the present embodiment the successive floors B are continuous through the tiers of coops but individual floors for each coop may be provided as will be later described.

The individual coops of each tier are provided with end walls composed of a series of vertically disposed bars as 10 sufficiently spaced to permit the poultry to pass their heads therebetween and feed from a trough as 11 located in the interval as 12 between the coops. It is necessary or advisable that the troughs be outside of the individual coops so that the poultry cannot climb thereon or therein and either soil the trough by their droppings or scratch the feed therefrom. In poultry cars as heretofore used it has been the usual practice to form the ends of the individual coops of spaced horizontally disposed slats or bars. This construction has proven very unsatisfactory, particularly with poultry having large combs.

One of these bars or slats is located above the trough and the poultry insert their heads between this bar and the near edge of the trough in order to feed. When they attempt to withdraw their heads, their combs quite frequently get caught on the bar and they choke to death on the upper edge of the trough before they can be freed by the attendant. Also in cold weather the combs get sore and the poultry will refuse to eat rather than put their heads under a bar which they are constantly striking. Furthermore the vertical bars simplify the construction of the coops and reduce the cost thereof for the same bars may extend substantially from the top of the car to the main car flooring C and form an end wall of each of the coops in the tier. Where the floor is continuous as in the present embodiment, a series of aligned holes in the successive coop floors may be bored and the rod merely inserted therein, the base of the rod either resting on the floor of the bottom coop or on the main floor of the car. With the vertical rods it is impossible for the fowls to get caught and they will not hesitate to feed even though their combs are sore.

The troughs in the present embodiment are supported by plates as 13 attached in any suitable manner to the upright corner posts 14 and are longitudinally slidable thereon to permit them to be withdrawn for filling or cleaning. Any other suitable method of supporting the troughs between the sets of bars might be adopted. Handles as 15 are preferably provided on the inner ends of the troughs to facilitate withdrawal. The coops are closed at the rear or outer side by the usual screening 16. Individual doors as 17 are provided for the coops. These are preferably hingedly mounted on the front corner posts 14 as at 18.

In the embodiment shown in Fig. 4 individual floors as 25 are provided for the coops. These are supported on the transverse angle irons 26 mounted on the corner posts. With this exception the contruction is the same as that shown in the previous embodiment. These floors may be either fixed or slidable upon such supports.

From the foregoing description it will be obvious that my poultry car construction is simple and efficient. The poultry are able to feed without danger or discomfort. The cost of construction of the car is materially reduced.

I am aware that the form and arrangement of parts of my improved poultry car may be considerably changed without departing from the spirit of my invention and I reserve the right to make all such as fairly fall within the terms of the following claims.

I claim as my invention:

1. A poultry car comprising a plurality of tiers of superimposed coops arranged in alignment and having open end walls, the end walls of adjoining tiers being fixed at distances apart to afford spaces to receive feed troughs and each comprising a plurality of spaced vertically disposed bars extending past the intermediate coops of the tier, and a plurality of feed troughs mounted in said spaces between the end walls of the coops.

2. A poultry car comprising a plurality of tiers of superimposed coops arranged in alignment and having open end walls, the end walls of adjoining tiers being fixed at distances apart to afford spaces to receive feed troughs and each comprising a plurality of spaced vertically disposed bars extending through the flooring of the intermediate coops of the tier, and a plurality of feed troughs mounted in said spaces between the end walls of the coops.

3. A poultry car comprising a plurality of tiers of superimposed coops arranged in alignment and having open end walls, the end walls of adjoining tiers being fixed at distances apart to afford spaces to receive feed troughs and the flooring of the coops extending across such intervening space, each of said end walls comprising a plurality of vertically disposed slats spaced sufficiently to permit the poultry to feed from said troughs, and feed troughs mounted between said floors in said space.

ISRAEL V. EDGERTON.